US008650170B2

(12) United States Patent
Tonn

(10) Patent No.: US 8,650,170 B2
(45) Date of Patent: Feb. 11, 2014

(54) SYSTEMS AND METHODS FOR INTER-OBJECT PATTERN MATCHING

(75) Inventor: Trevor Tonn, Sunnyvale, CA (US)

(73) Assignee: Verisign, Inc., Reston, VA (US)

( * ) Notice: Subject to any disclaimer, the term of this patent is extended or adjusted under 35 U.S.C. 154(b) by 96 days.

(21) Appl. No.: 13/166,256

(22) Filed: Jun. 22, 2011

(65) Prior Publication Data
US 2012/0330994 A1    Dec. 27, 2012

(51) Int. Cl.
*G06F 17/30* (2006.01)
(52) U.S. Cl.
USPC .......................................... 707/705; 707/706
(58) Field of Classification Search
USPC ................................................. 707/705, 706
See application file for complete search history.

(56) References Cited

U.S. PATENT DOCUMENTS

| | | | |
|---|---|---|---|
| 5,644,770 A | 7/1997 | Burke et al. | |
| 5,963,966 A * | 10/1999 | Mitchell et al. | 715/236 |
| 6,813,616 B2 | 11/2004 | Simpson et al. | |
| 7,062,483 B2 * | 6/2006 | Ferrari et al. | 1/1 |
| 7,325,201 B2 * | 1/2008 | Ferrari et al. | 715/737 |
| 7,567,957 B2 * | 7/2009 | Ferrari et al. | 1/1 |
| 7,694,150 B1 | 4/2010 | Kirby | |
| 7,809,666 B2 | 10/2010 | Citeau | |
| 7,814,088 B2 | 10/2010 | Simpson et al. | |
| 7,941,402 B2 * | 5/2011 | Smits | 707/638 |
| 2002/0083039 A1 * | 6/2002 | Ferrari et al. | 707/1 |
| 2003/0097357 A1 * | 5/2003 | Ferrari et al. | 707/3 |
| 2005/0108554 A1 | 5/2005 | Rubin et al. | |
| 2005/0289524 A1 * | 12/2005 | McGinnes | 717/140 |
| 2007/0083505 A1 * | 4/2007 | Ferrari et al. | 707/5 |
| 2008/0082484 A1 * | 4/2008 | Averbuch et al. | 707/3 |
| 2008/0301183 A1 * | 12/2008 | Garza-Gonzalez | 707/103 Y |
| 2010/0153420 A1 | 6/2010 | Yang | |
| 2010/0174526 A1 * | 7/2010 | Zhang | 704/9 |
| 2011/0067108 A1 | 3/2011 | Hoglund | |

OTHER PUBLICATIONS

Barbosa et al, "Using Latent-Structure to Detect Objects on the Web," Proceedings of the 13th International Workshop on the Databases, WebDB 2010, ACM SIGMOD 2010, 2010, Indianapolis, IN, (6 pages).

Emir et al., "Matching Objects with Patterns," LAMP-Report-2006-006, Proceedings of European Conference on Object-Oriented Programming—21st European Conference, 2007, Lausanne, Switzerland (25 pages).

(Continued)

*Primary Examiner* — Baoquoc N To
(74) *Attorney, Agent, or Firm* — MH2 Technology Law Group, LLP

(57) ABSTRACT

Systems and methods are disclosed for identifying objects from a collection of objects of diverse types that match a pattern. In one implementation, a system includes a processor and a memory. The memory stores instructions that cause the processor to receive a pattern input text identifying the pattern to be matched. The pattern input text comprises one or more conditions and a match statement. The processor also receives a collection of objects of diverse types, where each object comprises at least an attribute and a value associated with the attribute. The processor analyzes each object to determine whether the object satisfies the match statement based on an application of the one or more conditions to the attributes and attribute values for the object. If the processor determines that the object satisfies the match statement, the processor creates an output comprising an indication of the object and the conditions that caused the match statement to be satisfied.

19 Claims, 5 Drawing Sheets

(56) References Cited

OTHER PUBLICATIONS

Moreau et al., "A Pattern Matching Compiler for Multiple Target Languages," 12th Conference on Compiler Constructions, Warsaw Poland, vol. 2622 of LNCS, pp. 61-76, May 2003, http://www.loria.fr/~moreau/Papiers/MoreauRVI-CC2003.pdf (16 pages).

Visser, "Matching Objects Without Language Extension," http://wiki.di.uminho.pt/twiki/pub/Personal/Joost/MatchO/MatchingObjects-Draft-Nov2005.pdf, Nov. 2005, (19 pages).

Yara-Project, http://code.google.com/p/yara-project/, Apr. 13, 2011 (3 pages).

Deutsch et al., "A Query Language for XML", Computer Networks, Elsevier Science Publishers B.V., Amsterdam, NL, vol. 31, No. 11-16, May 17, 1999, pp. 1155-1169.

Extended European Search Report, issued from the European Patent Office, dated Sep. 19, 2012, in corresponding European Patent Application No. 12172838.0, 7 pages.

* cited by examiner

305
  Rule 1:                                                                300
      //Comment
      Conditions:            320
  310   $Condition A              325
          - Attribute 1: Comparison 1
  315      - Attribute 2 : Comparison 2
        $Condition B
          - Attribute 3: Comparison 3
        $ Condition C
          - Attribute 4: Comparison 4
          - Attribute 5: Comparison 5
  330     - Attribute 6: Comparison 6
     Match: (Condition A & Condition B) || Condition C Rule 2
      ...

FIG. 3

SYSTEMS AND METHODS FOR INTER-OBJECT PATTERN MATCHING

FIELD

This disclosure is generally directed to systems and methods for detecting patterns in objects and, more particularly, to systems and methods for detecting distinct patterns between objects of different types using a dynamic rule system.

BACKGROUND

Object oriented programming involves the creation, manipulation, and collection of objects. Objects may include anything that can be manipulated by a programming language. For example, an object may include a class instance of any object oriented programming language. An object is defined by attributes and functions and may be part of a collection of objects. For example, a web page contains objects of various types, such as a header object, a list object, an image object, etc. Each object includes attributes, such as a name or a font, and properties, which are similar to attributes but may include functions for data validation and active updating. Each object is partially defined by its collection of attributes and properties. Objects of different types may have attributes and properties in common and attributes and properties that differ.

Many objects used in web pages and data exchange include name/value pairs to describe attributes. For example, a web page may contain an image tag comprising "<img src="smiley.img" alt="a smiley face">. The image object of this example has two attributes; an "src" attribute with a value of "smiley.img" and an alt attribute with a value of "a smiley face." Likewise, objects created by tools such as extensible markup language (XML), may contain attribute name/value pairs. For example, an XML object may contain an invoice object such as "<invoice src="July2011.csv" discount="10?>. The invoice object of this example as has two attributes; a src attribute with a value of July2011.csv and a discount attribute with a value of 10.

Organizations may desire to determine objects that exhibit certain characteristics from a collection of diverse objects. For example, an organization may desire to locate all objects associated with a web page that have a specific word in the name or a specific parameter passed to a property. For example, objects having certain characteristics may be more likely to exhibit malicious behavior, such as malware. Furthermore, organizations may desire to know not only what objects match a particular pattern, but also what elements of the pattern the object matches. Moreover, the organizations may desire the ability to dynamically define the attributes and properties that comprise a pattern.

Currently, tools exist to locate patterns in a class of objects of the same type, but not for locating patterns in objects of different types, such as those common in collections of objects created by dynamically typed languages. Furthermore, these tools must be recompiled to process new patterns because the patterns are fixed and the tools cannot handle dynamic rule processing. Moreover, current tools indicate only whether an object matches a pattern and not what conditions caused the object to match a pattern.

Therefore, it is desirable to introduce tools to facilitate the identification of objects of different types that match a pattern, to identify the conditions that an object satisfied to match a pattern, and to allow dynamic description of the patterns, including the rules and conditions that define the pattern.

SUMMARY

Disclosed embodiments provide systems and methods that provide a dynamic pattern matching process, where the patterns need not be defined until the process is run. Disclosed embodiments may also allow pattern matching among collections of diverse objects that do not share the same type. Disclosed embodiments may also provide an output that identifies the objects that matched the pattern and the condition(s) that caused the object to match the pattern.

Consistent with disclosed embodiments, a method is provided for identifying objects of diverse types that match a pattern. The method includes receiving a pattern input text that includes at least one rule. The at least one rule may include a plurality of conditions and a match statement. The method may include receiving a collection of objects of diverse types, where each object of the collection of objects has one or more attributes and one or more attribute values. Each attribute value is associated with an attribute of the one or more attributes. The method may include determining whether the match statement is satisfied for each object in the collection of objects based on application of the conditions to the object's attributes and associated attribute values and generating an output that includes an indication of the rule and the objects from the collection of objects that satisfy that the match statement for the rule.

Consistent with other disclosed embodiments, a system for identifying objects of diverse types that match a pattern is provided. The system may include a processor and a memory. The memory may store instructions that direct the processor to perform operations. The operations may include receiving a pattern input text that includes at least one rule. The at least one rule may include a plurality of conditions and a match statement. The operations may include receiving a collection of objects of diverse types, where each object of the collection of objects has one or more attributes and one or more attribute values. Each attribute value is associated with an attribute of the one or more attributes. The operations may include determining whether the match statement is satisfied for each object in the collection of objects based on application of the conditions to the object's attributes and associated attribute values and generating an output that includes an indication of the rule and the objects from the collection of objects that satisfy that the match statement for the rule.

Consistent with other disclosed embodiments, computer-readable storage devices, such as RAM, ROM, compact disks, flash memory, cache memory, hard drives, servers, etc., may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 is a diagram illustrating an exemplary pattern input text, consistent with disclosed embodiments;

DESCRIPTION OF THE EMBODIMENTS

Disclosed embodiments provide systems and methods for locating objects of varying types that match a pattern. An embodiment of the system may receive a pattern input text, for example from a file or string, that represents rules and conditions that define a pattern. The system may receive the text from a user, from a repository, or from some other external source. The system may also receive a collection of diverse objects to be analyzed for patterns described in the text file. The system may analyze the diverse objects by applying the rules and conditions to the various diverse objects in the collection to determine which objects match one or more of the conditions. The system may create an output that identifies objects that match a pattern and may identify the conditions of the pattern that object satisfied.

The system may read the pattern input text and determine whether any of the objects in the collection of objects match any of the conditions for a pattern rule in the text. To accomplish this, the system may first determine whether the object has the attribute or property specified in a sub-condition of a condition. If the object does have the attribute or property specified, then the system may determine whether the value of the attribute or property matches a comparison statement, such as a substring function or a regular expression. The system may track what conditions the object satisfied and may use this information to determine whether the object matches the rule. If an object matches, the system may create an output with the details of what object and conditions were satisfied. The system may then processes the next object in the collection.

As described above, the pattern input text may be a file or a string. In one embodiment, the pattern input file is written in YAML (Yet Another Markup Language), with the rule name, one or more conditions, and one or more sub-conditions on separate lines of the file. In an exemplary embodiment, each sub-conditions may comprise an attribute or property name and also a comparison expression, such as a string function or regular expression, that must exist for the named attribute or property. Each condition may have one or more sub-conditions. The pattern input text may end with a match statement, or rule, that defines what conditions must be met for an object to match the pattern. For example, the match statement may indicate that Condition A and Condition B must be met, or Condition C must be met, i.e. "(A and B) or C."

Reference will now be made in detail to exemplary embodiments, examples of which are illustrated in the accompanying drawings. Wherever convenient, the same reference numbers will be used throughout the drawings to refer to the same or like parts.

Figure 1:
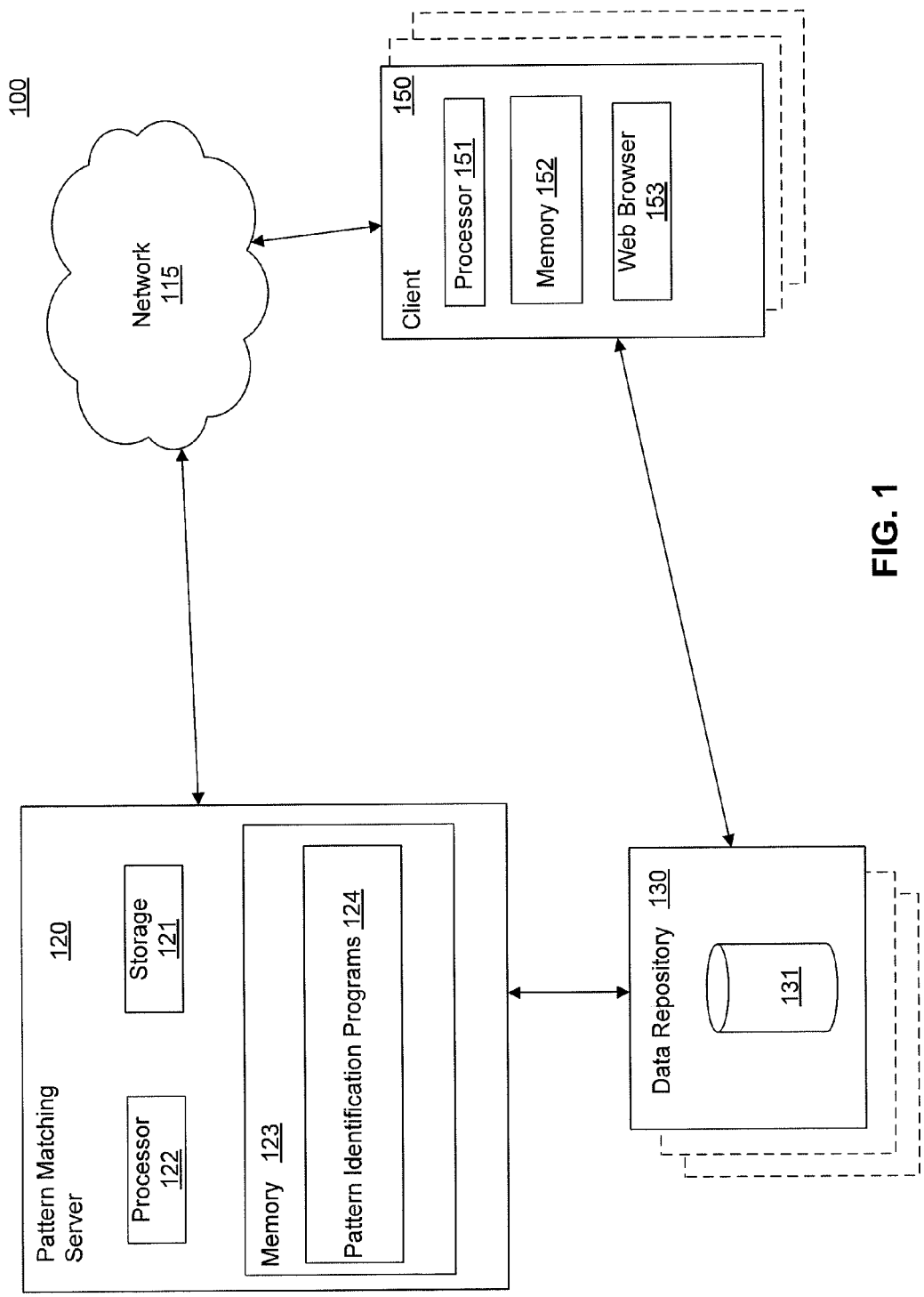
FIG. 1 is a diagram illustrating an exemplary inter-object pattern matching system that may be used to implement disclosed embodiments.

FIG. 1 is a diagram illustrating an exemplary pattern matching system 100 that may be used to implement disclosed embodiments, including exemplary system components. The components and arrangement, however, may be varied. Pattern matching server 120 may include a processor 122, a memory 123, input/output (I/O) devices (not shown), and storage 121. Pattern matching server 120 may be implemented in various ways. For example, pattern matching server 120 may be a general purpose computer, a server, a mainframe computer, or any combination of these components. Pattern matching server 120 may communicate over a link with network 115. For example, the link may be a direct communication link, a LAN, a WAN, or other suitable connection. Network 115 may include the Internet. Pattern matching server 120 may be standalone or it may be part of a subsystem, which may, in turn, be part of a larger system, such as a legacy malware detection system or web server.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of computer-readable medium used as a storage device.

In one embodiment, memory 123 may include one or more pattern identification programs or subprograms 124 loaded from storage 121 or elsewhere that, when executed by pattern matching server 120, perform various procedures, operations, or processes consistent with disclosed embodiments. For example, memory 123 may include a library including an inter-object pattern matching program that accepts a pattern input text and a collection of objects and produces an output of objects matching one of the patterns; an interface program that enables receipt of pattern input text and object collections; and an integrative support program that links the other programs and allows them to use a common database, provides a common user interface, performs basic bookkeeping tasks, (such as updating the library, etc.), and provides user guidance and help. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a pattern identification program 124 that performs several functions when executed by processor 122. For example, memory 123 may include a single program 124 that performs the functions of the pattern matching system, or program 124 could comprise multiple programs. Moreover, processor 122 may execute one or more programs located remotely from pattern matching server 120. For example, pattern matching server 120 may access one or more remote programs that, when executed, perform functions related to disclosed embodiments.

Memory 123 may be also be configured with an operating system (not shown) that performs several functions well known in the art when executed by pattern matching server 120. By way of example, the operating system may be Microsoft Windows™, Unix™, Linux™, Solaris™, an Apple Computers operating system, Personal Digital Assistant operating system such as Microsoft CE™, or some other operating system. The choice of operating system, and even to the use of an operating system, is not critical to any embodiment.

Pattern matching server 120 may include one or more I/O devices (not shown) that allow data to be received and/or transmitted by pattern matching server 120. I/O devices may also include one or more digital and/or analog communication input/output devices that allow pattern matching server 120 to communicate with other machines and devices, such as client computer 150. Pattern matching server 120 may receive data from external machines and devices and output data to external machines and devices via I/O devices, such as client computer 150. The configuration and number of input and/or output devices incorporated in I/O devices may vary as appropriate for certain embodiments.

Pattern matching server 120 may also be communicatively connected to one or more data repositories 130, e.g., through network 115. Data repository 130 may include one or more files or databases 131 that store information and are accessed and/or managed through pattern matching server 120. By way of example, the databases may be Oracle™ databases, Sybase™ databases, or other relational databases, or non-relational databases, such as HBase or Cassandra. The databases or other files may include, for example, object collections, pattern input files, other data related to inter-object pattern matching, etc. Systems and methods of disclosed embodiments, however, are not limited to separate databases.

Pattern matching server 120 may also be communicatively connected to one or more client computers 150 through network 115. Client computer 150 may include a processor 151, a memory 152, and a web browser 153 to communicate with pattern matching server 120. Pattern matching server 120 may send data to processor 151 and web browser 153, and web browser 153 may display the data as objects that match a pattern and the conditions of the pattern that were matched. In some embodiments, pattern matching server 120 may render an interface showing objects matching a pattern and send the interface to web browser 153 for display. In other embodiments, pattern matching server 120 may send the data used to create the interface to client computer 150 and client computer 150 may render the interface showing objects matching a pattern.

Client computer 150 may send data to pattern matching server 120 indicating selection of a pattern input text, a collection of objects, etc. Client computer 150 may include I/O devices (not shown) to enable communication with a user. For example, the I/O devices may include one or more input devices, such as a keyboard, touch screen, mouse, and the like, that enable client computer 150 to receive data from a user, such as pattern matching requests, pattern input text, the location of a collection of objects, etc. Further, client computer 150 may include I/O devices that communicate with one or more output devices, such as a display screen, CRT monitor, LCD monitor, plasma display, printer, speaker devices, and the like, that enable client computer 150 to present data to a user.

Figure 2:
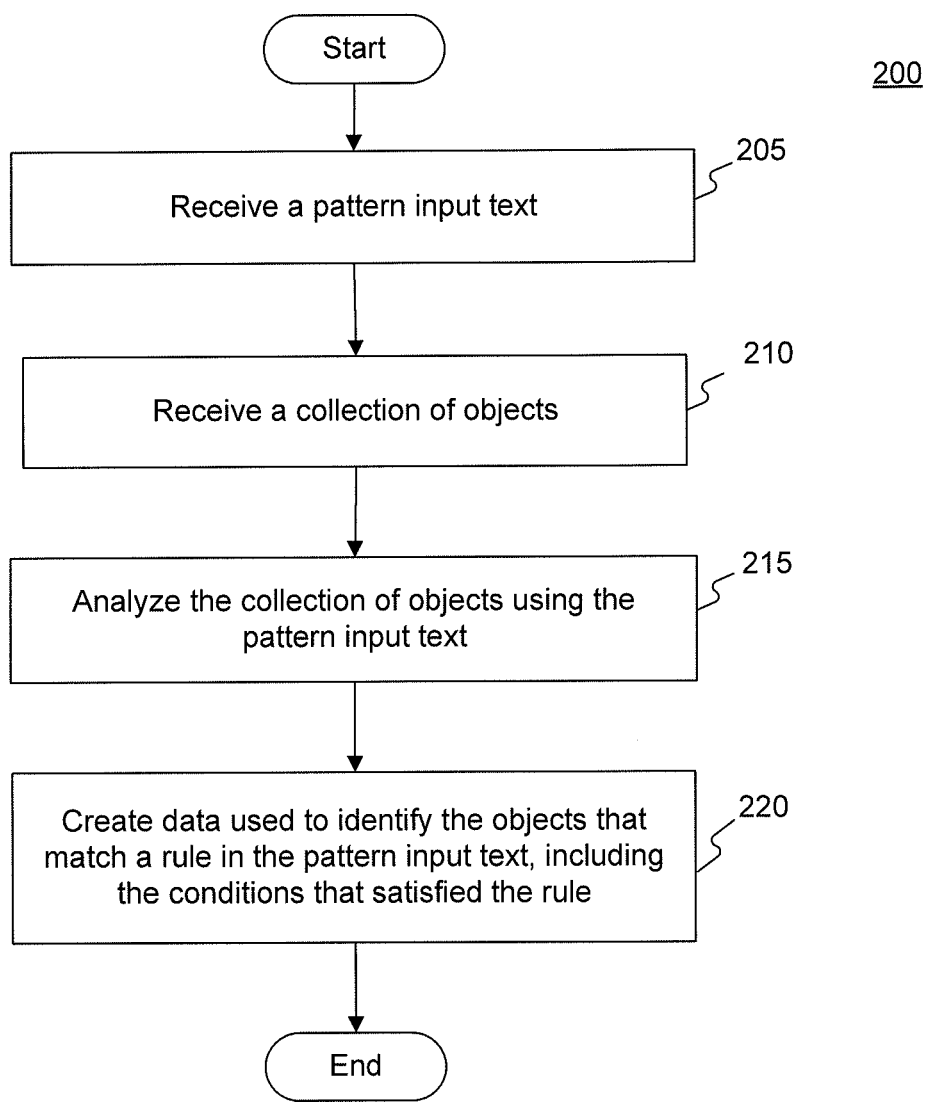
FIG. 2 is a flow diagram illustrating exemplary processes performed by an inter-object pattern matching system, consistent with disclosed embodiments.

FIG. 2 is flow diagram illustrating an exemplary processes 200 performed using a pattern matching server, consistent with disclosed embodiments. Process 200 is a high level view of how an inter-object pattern matching tool may operate. In certain embodiments, process 200 may be implemented according to pattern identification programs 124.

In Step 205 of FIG. 2, pattern matching server 120 may receive a pattern input text. The pattern input text may describe the rules associated with the pattern, the conditions associated with each rule, and a match statement that indicates which conditions must be met for a particular rule to be satisfied. In some embodiments, each condition may include one or more sub-condition. A sub-condition may comprise an attribute or a property and a comparison expression. As used herein, the term attribute may include both attributes and properties because of the similarities between attributes and properties.

The pattern input text may be received from a user, or a user may identify a location where the pattern input text is located and pattern matching server 120 may retrieve the pattern input text from the location. In some embodiments the pattern input text may be a string. In other embodiments, the pattern input text may be a file, a database table, or other document. Users may create the pattern input text and may submit a different pattern input text to pattern matching server 120 each time the inter-object matching process is invoked, without having to recompile pattern identification programs 124.

FIG. 3 is a diagram illustrating an exemplary pattern input text 300, consistent with disclosed embodiments. In some embodiments, pattern input text includes a rule name 305. Rule name 305 may identify the rule so that the output may easily identify the particular rule that was satisfied. Pattern input text 300 may also include comments that help a user describe the rule or identify the purpose of the rule. Although listed on separate lines in FIG. 3, the data items, such as rule name 305, the comment, and condition 310, may be delimited by a character or series of characters rather than placed on separate lines, as shown in FIG. 3. For example, a '$' (dollar sign) may indicate that what follows is a condition, a '-' (dash) may indicate that what follows is a sub-condition (an attribute/comparison pair), etc. Thus, the data items need not be on separate lines.

Pattern input text 300 may also include one or more conditions 310 for a rule. In some embodiments, a condition may include one or more sub-conditions 315. In such embodiments, all sub-conditions must be met for the condition to be met. Sub-condition 315 may comprise attribute 320 and comparison 325. A sub-condition may be met when the object being tested has the identified attribute and an attribute value that meets the identified comparison. A condition may be met when all of its sub-conditions are met.

Attribute 320 may be the name of an attribute possessed by an object. For example, different types of objects, such as image objects, document objects, and script objects, may have a "source" or "src" attribute. Accordingly, attribute 320 may be "src" or "source." In some embodiments Condition A may have a "src" attribute and Condition B may have a "source" attribute, and the match statement may indicate that either Condition A or Condition B is true. Thus, the rule may be set up to identify objects that have a source attribute, whether the attribute name is "source" or "sic."

Comparison 325 may include any type of regular expression. A regular expression is a means for matching strings of text, such as the value in an attribute name/value pair. For example, a regular expression may indicate that a sequence of characters appear consecutively, in order with other characters between them, as an isolated word, at the beginning or end of a word, etc. in a string of text. Comparison 325 may also include a substring match, a wildcard match, or other types of string operations.

Pattern input text 300 may also include match statement 330. Match statement 330 indicates what conditions must be met to satisfy rule 305. Match statement 330 may use Boolean operators to identify what combination of conditions satisfy rule 305. For example, match statement 305 may indicate that all conditions must be met (e.g. A & B & C), that one condition must be met but another must not be met (e.g. A & !B), that at least two conditions must be met (e.g. (A & B)|(A & C)|(B & C)), etc.

One skilled in the art will recognize that pattern input text 300 may store less than the information shown in FIG. 3, additional information, or different information than that shown in FIG. 3, without departing from disclosed embodiments. The information of pattern input text 300 need only be capable of identifying an attribute (including a property) of an object and the comparison performed on the attribute value of the object.

Returning to FIG. 2, in Step 210, pattern matching server 120 may receive a collection of objects that a user wishes to have analyzed. In some embodiments, the user may specify a location of the objects, such as on a data storage device, in a local or remote database, etc., and pattern matching server 120 may obtain the collection of objects from the specified location. In other embodiments, the user may provide the objects directly to pattern matching server 120 as a data file.

In Step 215, pattern matching server 120 may analyze the collection of objects to determine which of the objects match one or more of the rules defined in the pattern input text. Pattern matching server 120 may accomplish this analysis without a virtual machine or compiler modification because the patterns are part of the input process and not pre-compiled or written into pattern identification programs 124.

In Step 220, pattern matching server 120 may create data used to identify the objects that matched a rule defined in the pattern input text. The data may include the rule matched and the condition or conditions that the object matched to satisfy the rule. The data may also include an instance of the object that matched the rule.

Figure 4:
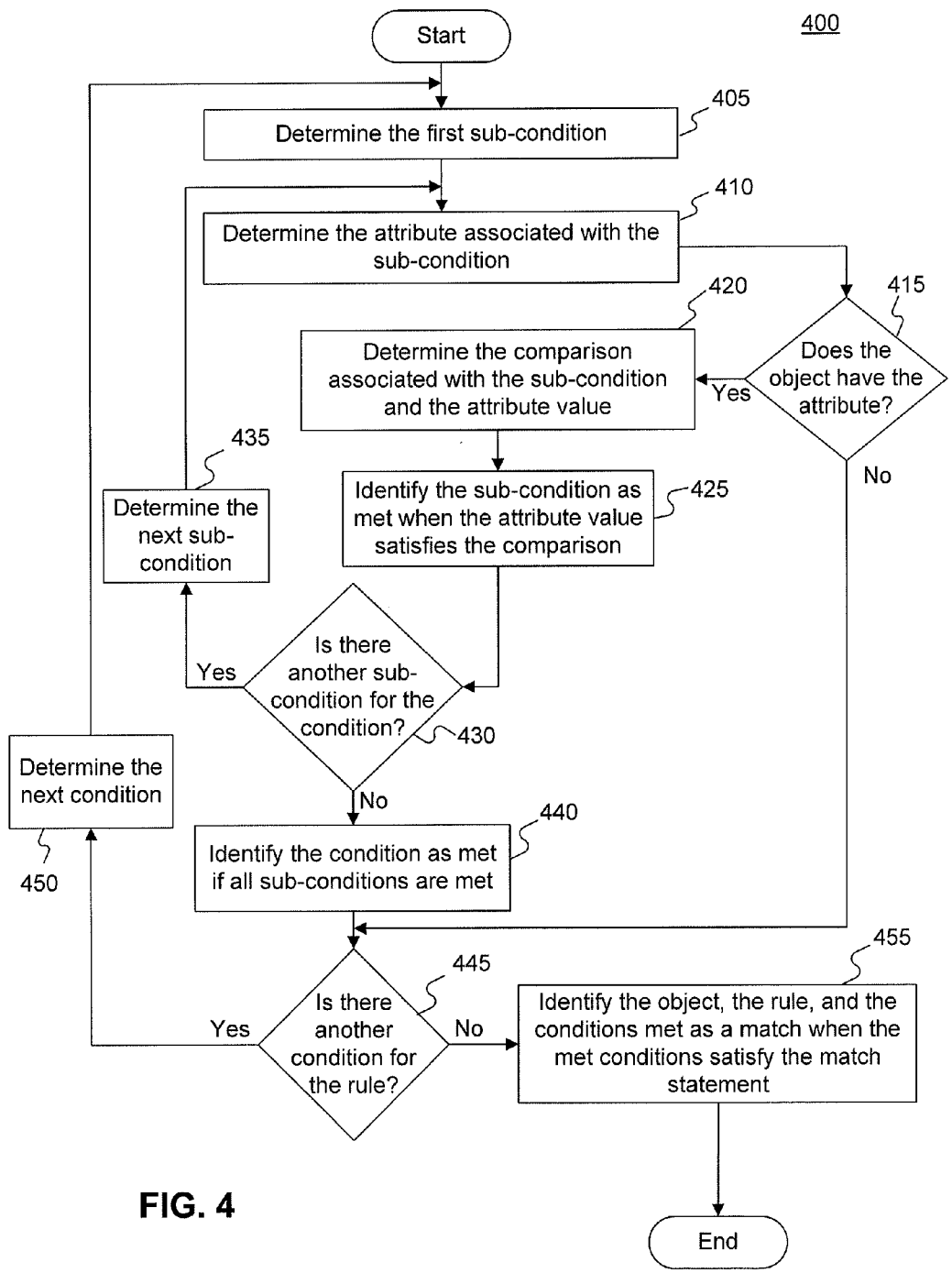
FIG. 4 is a flow diagram illustrating exemplary processes for analyzing whether an object satisfies a rule, consistent with disclosed embodiments.

FIG. 4 is a flow diagram illustrating an exemplary process 400 for analyzing whether an object satisfies a rule, consistent with disclosed embodiments. Pattern matching server 120 may execute process 400, for example, as part of the analysis of the collection of objects, described in Step 215 of FIG. 2, for each rule in a pattern input text. Thus, pattern matching server 120 may execute process 400 multiple times when processing a collection of objects, once for each object for each rule in the pattern input text.

At Step 405, pattern matching server 120 may identify the first sub-condition of a condition for a rule from the pattern input text. The first time pattern matching server executes process 400 for each object, the condition may be the first condition for the rule. Next, in Step 410, pattern matching server 120 may determine the attribute associated with the identified sub-condition. For example, the attribute associated with the identified sub-condition may be "source." In Step 415, pattern matching server 120 may determine whether the object being analyzed has the attribute associated with the identified sub-condition. For example, pattern matching server 120 may look through the defined attributes for an object to determine if one is "source." Pattern matching server 120 may not know the object class or type, but may be able to determine the whether the object has the desired attribute by looking through the name/value pairs of attributes.

If the object does not have the attribute (Step 415, No), then pattern matching server 120 proceeds to Step 445. Because all sub-conditions must be met for a condition to be met, once pattern matching server 120 determines that a sub-condition is not met, pattern matching server 120 may proceed to the next condition. But if the object does have the attribute (Step 415, Yes) then, in Step 420, pattern matching server 120 may determine the comparison expression associated with the identified sub-condition and the value associated with the attribute from the object. Although illustrated as a separate step, pattern matching processor 120 may determine the comparison expression when the attribute is determined, as part of step 410. As discussed above, a comparison may be a regular expression to be applied to the value associated with the attribute. For example, the condition may search for a specific set of characters within the value, such as ".txt" anywhere in the value, may search for a pattern of characters, or may search for a specific value.

In Step 425, pattern matching server 120 may identify the sub-condition as met if pattern matching server 120 determines that the attribute value satisfies the comparison expression. As part of the identification, pattern matching server 120 may store the sub-condition and the object in memory for later use, as will be described below.

At Step 430, pattern matching server 120 may determine whether there is another sub-condition for the condition. If so (Step 430, Yes), then, in Step 435, the next sub-condition is determined and pattern matching server 120 may perform Steps 410-430 with the next sub-condition. If there are no other conditions for this rule (Step 430, No) then, in Step 440, pattern matching server 120 may identify the condition as met if pattern matching server 120 determines that all of the condition's sub-conditions are met. In Step 445, pattern matching server 120 may determine whether there is another condition for the rule. If there is another condition (Step 445, Yes) then, in step 450, pattern matching server 120 determines the next condition and may perform Steps 405-445 for the next condition.

If no other conditions exist for the rule (Step 445, No) then, in Step 455, pattern matching server 120 may identify the object, the rule, and the conditions met by, for example, storing these values, if pattern matching server determines that the met conditions satisfy the match statement for the rule. Pattern matching server 120 may use the identified object, rule, and conditions met to create the output described in Step 220 of FIG. 2.

Figure 5:
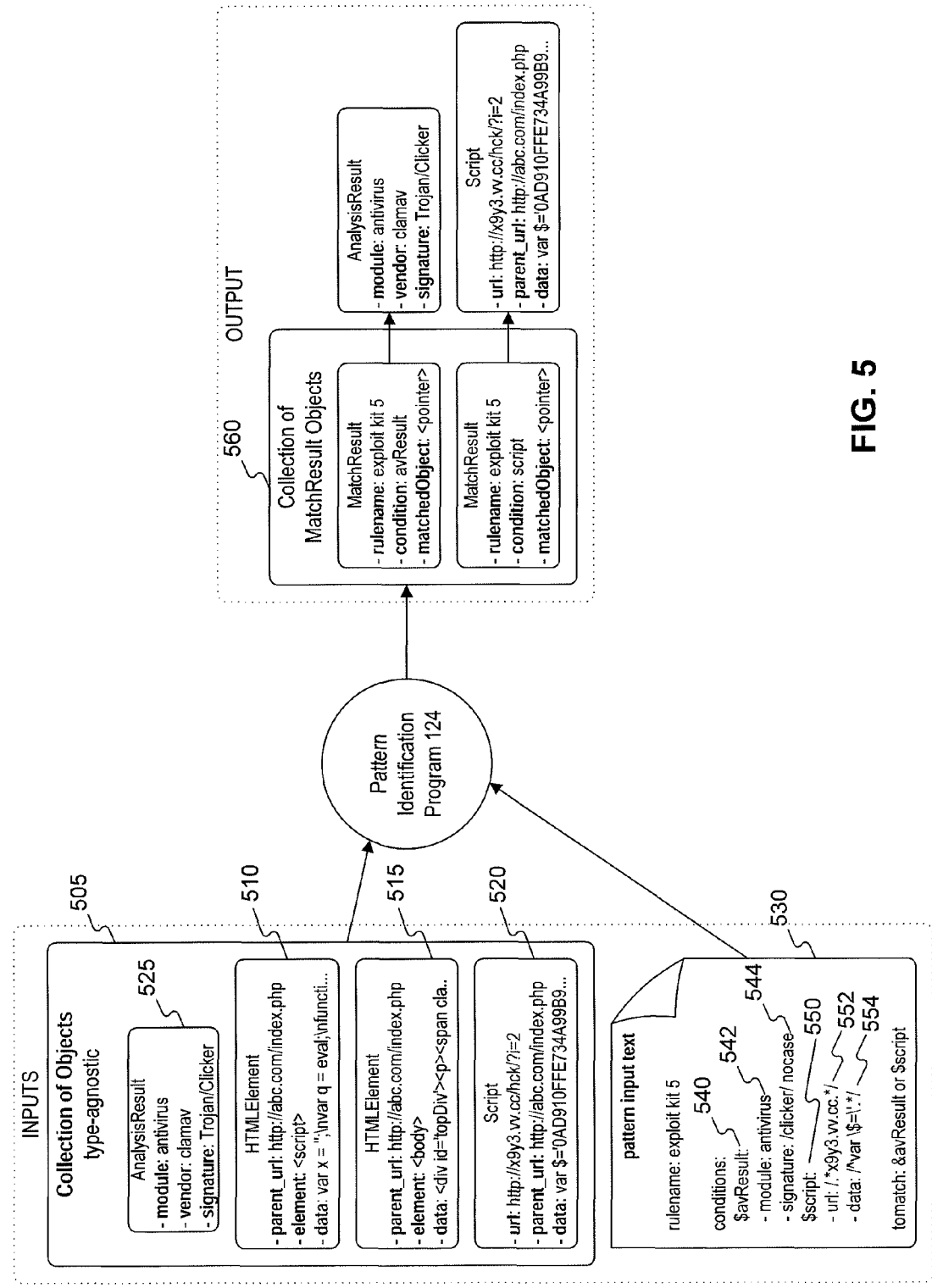
FIG. 5 is a diagram illustrating exemplary inputs and outputs of an inter-object pattern matching system, consistent with disclosed embodiments.

An example of identifying patterns in objects of diverse types will now be explained using FIG. 5. A user may provide a collection of objects 505 to pattern identification program 124, which may run on pattern matching server 120. Collection of objects 505 may include objects 510, 515, and 520 that may be taken from a web page, and object 525, which may be created, for example, from the output of an anti-virus program. The user may also provide pattern input text 530. In the example of FIG. 5, pattern input text 530 includes a rule named "exploit kit 5" and two conditions—"avResult" and "script." In some embodiments, conditions may be marked with a character, such as the '$' (dollar sign) character, although other characters may be used to identify a condition.

The "avResult" condition 540 includes two sub-conditions (attribute/comparison pairs). Sub-condition 542 includes an attribute of "module" and a comparison indicating that the module attribute must have a value of "antivirus." Sub-condition 544 includes an attribute of "signature" and the comparison indicates the value of the signature attribute must include "clicker" without having to match on case. "Script" condition 550 of the "exploit kit 5" rule also has two sub-conditions. Sub-condition 552 indicates that a "url" attribute must contain the substring "x973.vv.cc" somewhere in the attribute value, and sub-condition 554 indicates that a "data" attribute must contain the substring "var $=."

Pattern matching server 120 may run pattern identification program 124 using the two inputs, 505 and 530. First, pattern matching server 120 may run process 400 on object 525, "AnalysisResult." Accordingly, pattern matching server 120 may identify condition 540 as the first condition and sub-condition 542 as the first sub-condition. Pattern matching server 120 may analyze the attributes of object 525 and determine that object 525 does have a "module" attribute. Pattern matching server 120 may then determine whether the value of the "module" attribute of object 525 matches the comparison of sub-condition 542. In this example, the value does satisfy the comparison and, therefore, pattern matching server 120 may identify sub-condition 542 as met for object 525.

Pattern matching server 120 may then determine that sub-condition 544 should be analyzed, and examine the attributes of object 525 to determine if sub-condition 544 is met. Because object 525 does have an attribute of "signature" with a value containing the string "clicker," pattern matching server 120 may determine that sub-condition 544 is met. Because no other sub-conditions exist for condition 540, pattern matching server 120 identifies condition 540 as met because its sub-conditions 542 and 544 were both met.

Pattern matching server 120 may then analyze object 525 with regard to condition 550. Pattern matching server 120 may first analyze object 525 to determine whether it has the "url" attribute identified by sub-condition 552. Because object 525 does not have a "url" attribute, pattern matching server 120 may skip to the next condition. Because no other conditions exist for the "exploit kit 5" rule, pattern matching server 120 may analyze the match statement to determine whether object 525 has satisfied enough conditions to satisfy the rule. Because object 525 met condition 540 and the match statement of the "exploit kit 5" rule only requires that either condition 540 or condition 550 is met, object 525 satisfies the match statement and is considered as matching the pattern identified in pattern input text 530.

Because object 525 matches the pattern, pattern matching server 120 may create an output 560 that identifies object 525 as matching the "exploit kit 5" rule. In some embodiments, output 560 may also identify condition 540 because condition 540 caused object 560 to satisfy the match statement. Output 560 may include data, such as an object that contains the name of the rule matched and a pointer to object 525. In other embodiments, output 560 may include data used to display the name of the rule, the name of the condition, and the name of the object matched.

Pattern matching server 120 may then analyze object 510 to determine whether any of the attributes of object 510 match the "exploit kit 5" rule. Because object 510 does not have a "module" or a "signature" attribute, pattern matching server 120 determines that object 510 does not meet condition 540. Likewise, because object 510 does not have a "url" attribute, it does not match condition 550. Thus, pattern matching server 120 determines that object 510 does not match and will not be included in output 560. Pattern matching server 120 may then analyze object 515. Like object 510, object 515 does not have the required attributes to meet conditions 540 and 550. Therefore, pattern matching server 120 will not include object 515 in output 560.

Pattern matching server 120 may then analyze object 520. While object 520 does not have a "module" or "signature" attribute, object 520 does have the "url" and "data" attributes. Pattern matching server 120, using process 400, may determine that the values associated with the attributes in object 520 do satisfy the comparison expressions of sub-conditions 552 and 554. Therefore, pattern matching server 120 may determine that object 520 meets condition 550, and determine that this satisfies the match statement. Accordingly, pattern matching server 120 may include object 520 in output 560, as indicated in FIG. 5.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage devices, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of dynamically typed languages such as Python, PHP, JavaScript or other languages such as .Net Framework, .Net Compact Framework (and related languages, such as Visual Basic, C, etc.), XML, Java, C++, Flex, Silverlight, or any other now known or later created programming language. One or more of such software sections or modules can be compiled into a library and integrated into a computer system or existing software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method for identifying objects of diverse types that match a pattern, the method comprising:
   receiving a pattern input text comprising at least one rule, the at least one rule comprising a plurality of conditions and a match statement, the match statement comprising a Boolean expression comprising at least one Boolean operator and the plurality of conditions;
   receiving a collection of objects of diverse types, each object of the collection of objects comprising one or more attributes and one or more attribute values, each attribute value associated with an attribute of the one or more attributes;
   determining, by a processor, that the match statement is satisfied for a matched object in the collection of objects based on an application of the plurality of conditions to the one or more attributes and the one or more attribute values for each object; and
   generating, by the processor, an output comprising an indication of the matched object from the collection of objects and the rule.

2. The method of claim 1, wherein the output further comprises at least one condition of the plurality of conditions.

3. The method of claim 1, wherein the conditions comprise an attribute name and a comparison expression, and wherein the application of a condition of the plurality of conditions to the one or more attributes comprises:
   determining whether any of the one or more attributes match the attribute name associated with the condition;

when the attribute name matches an attribute, determining whether the attribute value associated with the attribute satisfies the comparison expression associated with the condition; and determining that the condition is met when the attribute value satisfies the comparison expression.

4. The method of claim 3, wherein the match statement is satisfied when at least one condition is met.

5. The method of claim 1, wherein the attributes include one or more properties.

6. The method of claim 1, wherein the conditions comprise a plurality of sub-conditions and wherein the sub-conditions comprise an attribute name and a comparison expression.

7. The method of claim 6, wherein the application of at least one condition to the one or more attributes comprises, with respect to each sub-condition:

determining whether any of the one or more attributes match the attribute name of the sub-condition and when the attribute name matches, determining whether the attribute value associated with the attribute satisfies the comparison, and determining that the sub-condition is met when the attribute value satisfies the comparison expression; and wherein determining whether the condition is met is based on determining that the plurality of sub-conditions are met.

8. The method of claim 7, wherein the output further comprises the condition that is met.

9. The method of claim 1, wherein the application of the plurality of conditions to the one or more attributes and the one or more attribute values for each object comprises, with respect to each condition:

determining whether any of the attributes and attribute values satisfy a sub-condition associated with the condition; and determining that the condition is met when the sub-condition is satisfied;

wherein determining whether the match statement is satisfied is based on whether the conditions are met or not met.

10. A system for identifying objects of diverse types that match a pattern, comprising:

a processor; and a memory coupled to the processor, the memory storing instructions to direct the processor to perform operations comprising:

receiving a pattern input text comprising at least one rule, the at least one rule comprising a plurality of conditions and a match statement, the match statement comprising a Boolean expression comprising at least one Boolean operator and the plurality of conditions, receiving a collection of objects of diverse types, each object of the collection of objects comprising one or more attributes and one or more attribute values, each attribute value associated with an attribute of the one or more attributes, determining that the match statement is satisfied for a matched object in the collection of objects based on an application of the plurality of conditions to the one or more attributes and the one or more attribute values for each object, and generating an output comprising an indication of act the matched object from the collection of objects and the rule.

11. The system of claim 10, wherein the output further comprises at least one condition of the plurality of conditions.

12. The system of claim 10, wherein the conditions comprise an attribute name and a comparison expression, and wherein the application of a condition of the plurality of conditions to the one or more attributes comprises performing the operations of:

determining whether any of the one or more attributes match the attribute name associated with the condition;

when the attribute name matches an attribute, determining whether the attribute value associated with the attribute satisfies the comparison expression associated with the condition; and determining that the condition is met when the attribute value satisfies the comparison expression.

13. The system of claim 10, wherein the conditions comprise a plurality of sub-conditions and wherein the sub-conditions comprise an attribute name and a comparison expression, and wherein the application of at least one condition to the one or more attributes comprises performing the operations of, with respect to each sub-condition:

determining whether any of the one or more attributes match the attribute name of the sub-condition and when the attribute name matches, determining whether the attribute value associated with the attribute satisfies the comparison; and determining that the sub-condition is met when the attribute value satisfies the comparison expression, wherein determining whether the condition is met is based on determining that the plurality of sub-conditions are met.

14. The system of claim 13, wherein the output further includes the condition that is met.

15. The system of claim 10, wherein the application of the plurality of conditions to the one or more attributes and the one or more attribute values for each object comprises, with respect to each condition, the operations of:

determining whether any of the attributes and attribute values satisfy a sub-condition associated with the condition; and determining that the condition is met when the sub-condition is satisfied, wherein determining whether the match statement is satisfied is based on whether the conditions are met or not met.

16. A non-transitory computer-readable storage device storing instructions for identifying objects of diverse types that match a pattern, the instructions causing one or more computer processors to perform operations, comprising:

receiving a pattern input text comprising at least one rule, the at least one rule comprising a plurality of conditions and a match statement, the match statement comprising a Boolean expression comprising at least one Boolean operator and the plurality of conditions;

receiving a collection of objects of diverse types, each object of the collection of objects comprising one or more attributes and one or more attribute values, each attribute value associated with an attribute of the one or more attributes;

determining that the match statement is satisfied for a matched object in the collection of objects based on an application of the plurality of conditions to the one or more attributes and the one or more attribute values for each object; and generating an output comprising an indication of the matched object from the collection of objects and the.

17. The non-transitory computer-readable storage device of claim 16, wherein the conditions comprise a plurality of sub-conditions and wherein the sub-conditions comprise an attribute name and a comparison expression, and wherein the application of at least one condition to the one or more attributes comprises, with respect to each sub-condition:

determining whether any of the one or more attributes match the attribute name of the sub-condition and when the attribute name matches, determining whether the attribute value associated with the attribute satisfies the comparison expression; and determining that the sub-condition is met when the attribute value satisfies the comparison expression, wherein determining whether the condition is met is based on determining that the plurality of sub-conditions are met.

18. The storage device of claim 17, wherein the output further includes the condition that is met.

19. The storage device of claim 14, wherein the application of the plurality of conditions to the one or more attributes and the one or more attribute values for each object comprises:

for each condition:

determining whether any of the attributes and attribute values satisfy a sub-condition associated with the condition; and determining that the condition is met when the sub-condition is satisfied;

wherein determining whether the match statement is satisfied is based on whether the conditions are met or not met.

\* \* \* \* \*